Figure 1:
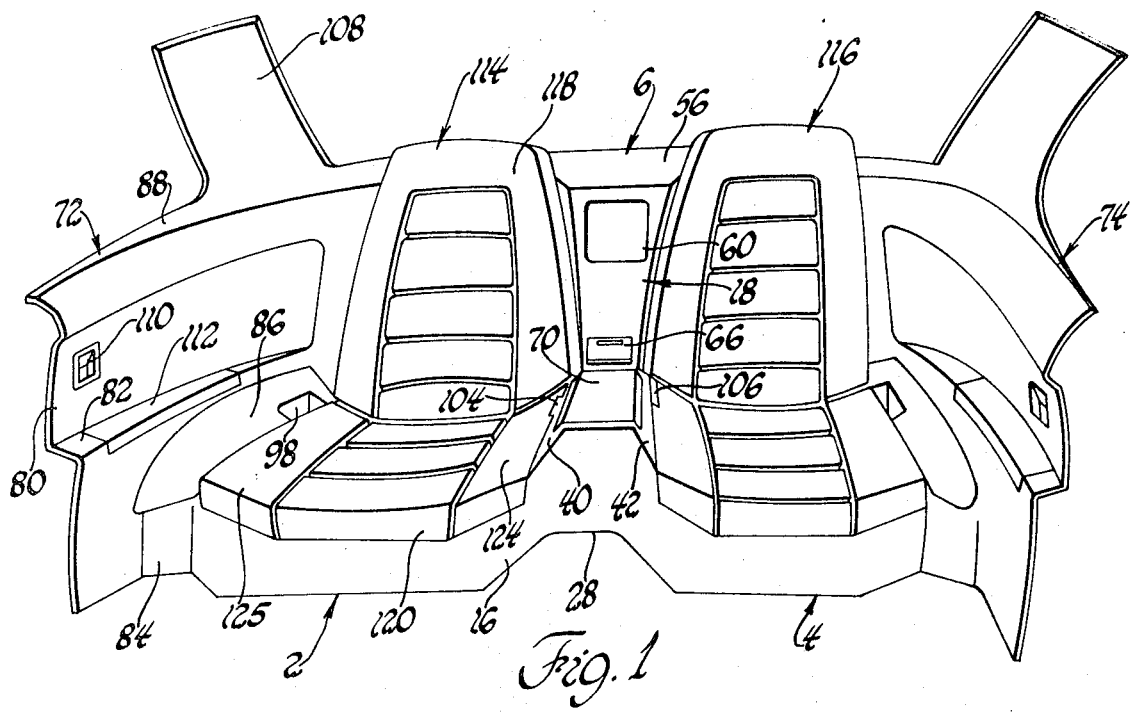

United States Patent

[11] 3,632,157

[72] Inventor Thomas E. Lohr
 Warren, Mich.
[21] Appl. No. 855,195
[22] Filed Sept. 4, 1969
[45] Patented Jan. 4, 1972
[73] Assignee Allied Chemical Corporation
 New York, N.Y.

[54] AUTOMOBILE REAR SEAT AND INTERIOR SIDE PANEL ASSEMBLY
 8 Claims, 3 Drawing Figs.

[52] U.S. Cl. .................................................. 296/31 P,
 296/28 R, 296/63, 297/232
[51] Int. Cl. ................................................. B60n 1/00
[50] Field of Search ........................................ 296/28, 31
 P, 63, 64; 297/232, 117, DIG. 2, 440, 450

[56] References Cited
UNITED STATES PATENTS

| | | | |
|---|---|---|---|
| 1,431,581 | 10/1922 | Hanneman | 296/63 |
| 3,030,146 | 4/1962 | Faxon | 297/422 |
| 813,460 | 2/1906 | Smith | 297/232 X |
| 1,370,886 | 3/1921 | Genge | 296/63 |
| 2,525,339 | 10/1950 | Chausson | 296/28 |
| 3,172,695 | 3/1965 | Bordinat | 296/63 |
| 3,175,863 | 3/1965 | Hood | 297/455 |
| 3,409,323 | 11/1968 | Schweser | 296/28 |

FOREIGN PATENTS

| | | | |
|---|---|---|---|
| 1,065,311 | 4/1967 | Great Britain | 296/28 |
| A21,823 | 8/1956 | Germany | |

Primary Examiner—Leo Friaglia
Assistant Examiner—Leslie J. Paperner
Attorneys—Marvin Bressler and Jonathan Plaut ABSTRACT: An automobile rear seat and interior side panel assembly including a unitary seat-supporting member of rigid urethane foam having a pair of seat walls formed therein and separated by an integral central divider. One-piece interior side panels are provided on each side of the seat-supporting member of rigid urethane foam, and an elastomeric urethane foam seat is received in each seat well.

INVENTOR.
Thomas E. Lohr
BY
Barnard, McGlynn & Reising
ATTORNEYS

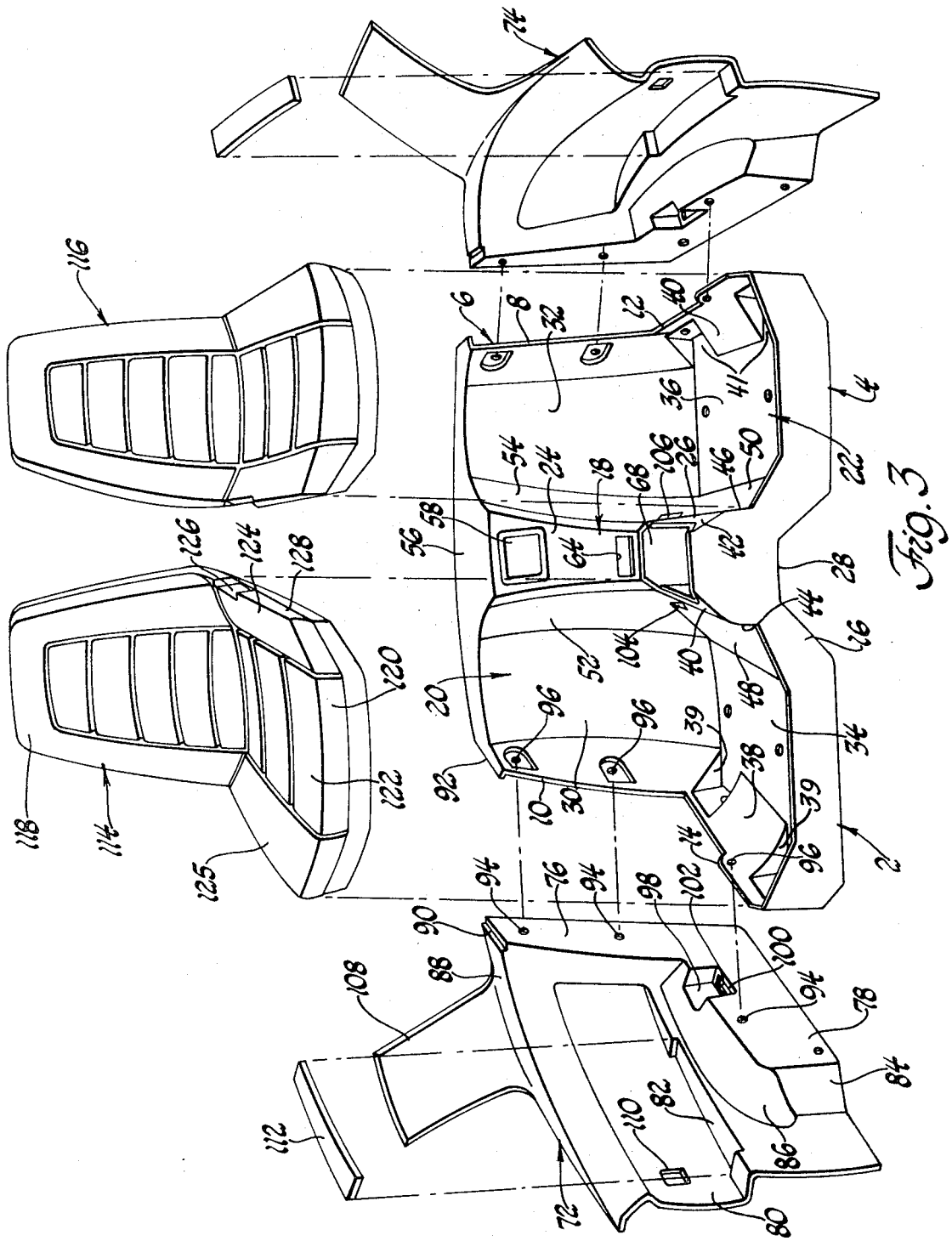

AUTOMOBILE REAR SEAT AND INTERIOR SIDE PANEL ASSEMBLY

This invention relates generally to the construction of automobiles, and is particularly concerned with an automobile rear seat assembly and an interior side panel assembly that can be installed as a unit in automobiles during their construction and assembly.

In conventional automobile construction, the rear passenger compartment includes several pieces of upholstery in addition to one or more seat sections. The rear seat generally includes separate back and bottom portions which must be fabricated and installed separately in the automobile. Complex mounting structures for the seat back and bottom portions must be included in the automobile framework and there are generally numerous slots and gaps between the various components in which articles and trash can become lodged. The fact that the upholstery and seat components are made up of several pieces which must be separately fabricated and assembled together increases the cost of production.

It is an object of this invention to provide an automobile rear seat assembly including a seat support of unitary rigid plastic foam construction with elastomeric foam seats mounted therein that can be installed as a unit in an automobile.

A further object is to provide an automobile rear seat and interior side panel assembly including a rigid plastic foam seat support having a pair of seat wells formed therein with a central divider between the seat wells, and interior rigid plastic foam side panels on each side of the seat support with an elastomeric plastic foam seat received in each of the seat wells.

Figure 2:
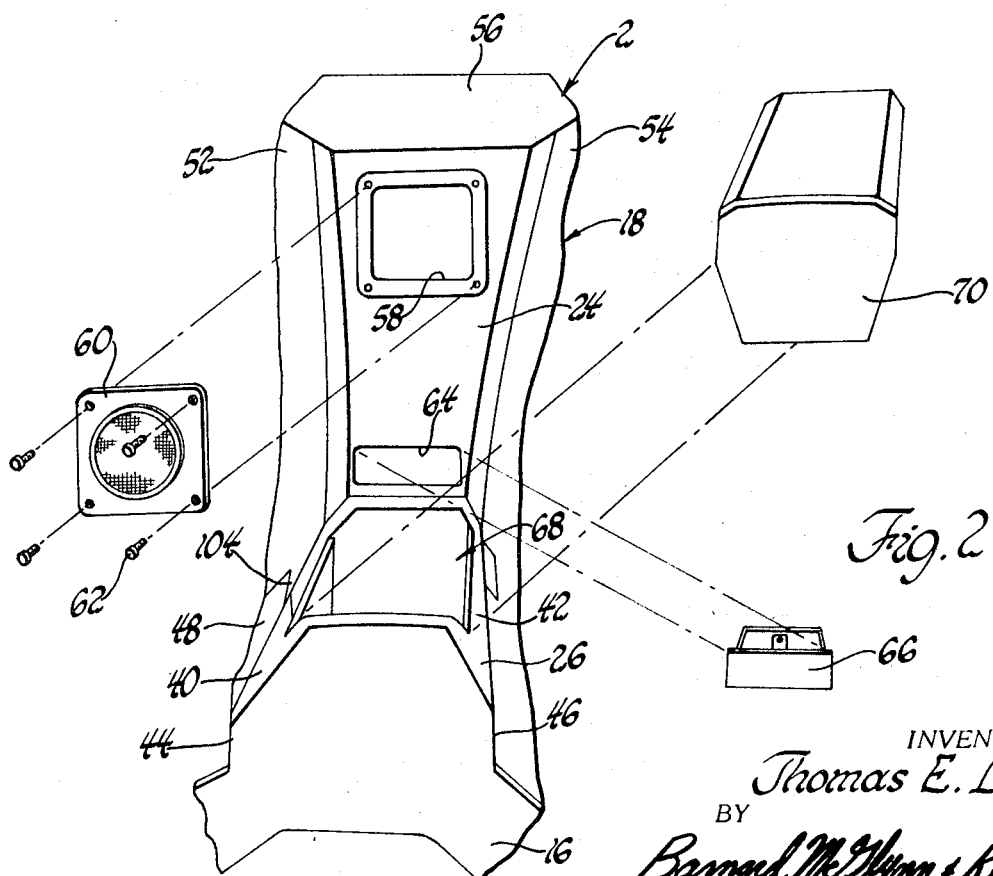

In carrying out the foregoing, and other objects, an automobile rear seat assembly according to the present invention includes a unitary rigid urethane foam seat support formed with a pair of seat wells separated by a central divider. Elastomeric urethane foam seats are mounted in the seat wells, and accessory components such as a glove box, ash trays, and speakers are mounted in the central divider between the seats. Rigid urethane foam interior side panels are attached to the sides of the seat unit. Each side panel is formed with an interior sail panel for extending between the rear side window and rear window of an automobile. Other objects, advantages and features of the invention will become apparent from the following description taken in connection with the accompanying drawings in which:

FIG. 1 is a perspective view of an automobile rear seat and side panel assembly embodying the present invention:

FIG. 2 is an enlarged, fragmentary, exploded perspective view of a portion of the assembly of FIG. 1; and FIG. 3 is an exploded perspective view of the assembly of FIG. 1. The drawings illustrate an automobile rear seat assembly comprising a one-piece molded plastic seat support designated collectively by reference numeral 2. The seat support 2 includes a seat bottom supporting portion designated generally by reference numeral 4 and a seat back supporting portion designated generally by reference numeral 6. The seat back supporting portion 6 has a pair of outer sidewalls 8 and 10 projecting forwardly from the outer edges thereof, and the seat bottom supporting portion has a pair of outer sidewalls 12 and 14 projecting upwardly from the outer edges of the seat bottom supporting portion and extending forwardly from the lower ends of the outer sidewalls 8 and 10 respectively, of the seat back supporting portion 6. The seat bottom supporting portion further includes an upwardly projecting front wall 16 extending between the upwardly projecting outer sidewalls 12 and 14.

The seat supporting member 2 further includes a central divider designated generally by reference numeral 18 which cooperates with the outer sidewalls 8, 10, 12 and 14 to define a pair of seat-receiving wells 20 and 22. The divider 18 includes an upright portion 24 projecting forwardly from the back-supporting portion 6 and a horizontal raised portion 26 on the bottom-supporting portion 4 which extends forwardly from the lower end of the upright portion 24. The lower edge of the front wall 16 is cut away as shown in 28 to provide access for the raised portion of an automobile floor that provides access for the drive shaft of the vehicle.

The seat well 20 includes a backwall portion 30 extending between the upright divider portion 24 and the outer sidewall 10. Similarly, the seat well 22 includes a backwall portion 32 extending between the divider portion 24 and the outer sidewall 8. The seat well 20 also includes a bottom wall portion 34 extending between the horizontal raised portion 26 and the outer sidewall 14, and the seat well 22 includes a bottom wall portion 36 extending between the horizontal raised portion 26 of the outer sidewall 12. The outer sidewall 14 has a downwardly and inwardly inclined portion 38 defining corner recesses 39 and the outer sidewall 12 has a similar downwardly and outwardly inclined portion 40 defining corner recessed 41 (FIG. 2). The horizontal raised portion 26 of the central divider 18 is formed with inclined side surfaces 40 and 42 that extend downwardly and outwardly to the upper edges of vertical portions 44 and 46, respectively. The lower edges of the vertical side surfaces 44 and 46 are coextensive with the upper edges of downwardly and outwardly inner sidewalls 48 and 50, respectively, of the bottom portions of the seat wells 20 and 22, respectively. The upright portion 24 of divider 18 has rearwardly and outwardly extending inclined side surfaces 52 and 54 forming the inner sidewalls of the back portion of seat wells 20 and 22, respectively Extending rearwardly from the upper edge of the back-supporting portion 6 is a top ledge portion 56.

The upright portion 24 of the central divider 18 is formed with an upper recess 58 for mounting an accessory such as a speaker having a grille 60 (FIG. 2) which may be secured to the face of the central divider portion 24 by conventional screws 62. A lower accessory-mounting opening 64 is formed in the divider portion 24 for mounting an accessory such as an ashtray 66 (FIG. 2). Formed in the horizontal raised portion 26 of the central divider 18 is a mounting recess 68 for receiving an accessory such as a glove box 70 (FIG. 2).

As shown in FIG. 1, a pair of one-piece molded plastic interior side panels 72 and 74 are secured to each sidewall of the seal-supporting member 2. The side panels 72 and 74 are of identical construction except that one is the mirror image of the other, and accordingly, only side panel 72 would be described in detail.

Side panel 72 is formed with an upright attachment flange 76 which is secured to the outer sidewall 10 of the seat back supporting portion 6 and a forwardly extending attachment flange 78 which is secured to the outer sidewall 14 of the seat bottom supporting portion 4. Side panel 72 is curved outwardly and forwardly from the upright attachment flange 76 and is formed with an outwardly extending offset portion 80 which defines an armrest 82. Side panel 76 is further formed with an inwardly extending projection 84 having a top surface 86 extending downwardly and inwardly to the upper edge of the forwardly extending attachment flange 78. Integrally formed on the upper edge of side panel 72 is an outwardly projecting top ledge 88 which forms an extension of the top ledge 56 of the seat mounting portion 2 when the side panel 72 is secured to the adjacent sidewall of the seat-mounting portion 2. A notch 90 is formed at the junction of the upper edge of the upright attachment portion 76 with the top ledge portion 88 for receiving an outwardly extending lip 92 of top ledge portion 56 of the seat-mounting portion 2.

Fastener receiving openings 94 and 96 are provided respectively in the side panel and seat-mounting portion for securing the attachment flanges 76 and 78 to the respective outer sidewalls 10 and 14. The fastener openings 96 are formed in recessed surfaces in sidewall 10.

The inwardly extending projection 84 is formed with a recess 98 having a horizontal wall 100 with an opening 102 formed therein for receiving a seatbelt which may be anchored to the vehicle frame beneath the assembly. Similarly, a seatbelt receiving recess 104 is defined in the inclined side surface 48 forming the inner sidewall of the seat well 20. A similar recess 106 is defined for seat wall 22.

Integrally formed on the top ledge 88 of side panel 72 is an upwardly extending interior sail panel 108 adapted to extend between the rear and side window openings of the automobile. One or more access openings 110 can be provided in the side panel 72 for receiving a window operator and the like, and an elastomeric foam plastic armrest 112 may be secured by the armrest ledge 82 by a suitable adhesive or by conventional fasteners.

Seats 114 and 116 are respectively received in seat wells 20 and 22. Since seats 114 and 116 are of identical construction except that one is constructed for the right-hand seat well and the other for the left-hand seat well, only seat 114 will be described in detail. Seat 114 is of unitary molded plastic elastomeric foam, preferably urethane foam, and includes a back portion 118 which is seated against the backwall portion 30 of seat well 20 and a bottom portion 120 which is seated against the bottom wall portion 34 of seat well 20. The seat bottom 120 includes a generally flat central portion 122 and upwardly and outwardly inclined side bolster portions 124 and 125. The inner side bolster portion 124 is formed with a notch 126 for communication with the seatbelt-receiving opening 104, and the outer edge of the side bolster 124 is adapted to be received against the vertical portion 44 of the central portion 24 of the divider. Thus, the upwardly and outwardly inclined portions 124 and 125 generally blend into the contour of the surfaces 40 and 86 on either side of the seat bottom. The seats may be secured in position in their respective wells by a suitable adhesive, by conventional fasteners, or by mounting means including a mounting rod embedded in the molder plastic for engagement with spring clips mounted on the support member 2, such as disclosed, for example, in the copending application of Thomas E. Lohr entitled "Seat Construction and Method," Ser. No. 843,055 filed July 18, 1969 and assigned to the assignee of this invention. likelyhood The seat-supporting member 2 and the side panels 72 and 74 can each be molded as a unit of rigid urethane foam which provides adequate strength and rigidity. Furthermore, coloring materials can be added to the foamable base before changing the mold for forming each of the various components. The seats 114 and 116, as well as the armrest 112, may be formed of elastomeric urethane foam. Molding of the parts provides components having the same dimensions and tolerances to reduce the likelihood of mismatch between the components. Parts formed from the same mold will, of course, be the same size and have the same dimensions providing optimum interchangeability.

While a specific embodiment of the invention has been illustrated and described in the foregoing specification and accompanying drawings, it should be understood that various alternatives in the construction and arrangement of parts is possible without departing from the scope and spirit of the invention.

The embodiments of the invention in which an exclusive property or privilege is claimed are defined as follows:

1. An automobile rear seat assembly comprising:
a one-piece molded plastic seat support, said seat support having a seat bottom supporting portion and a seat back supporting portion; said seat back supporting portion having a pair of outer sidewalls projecting forwardly from the outer edges of said seat back supporting portion, and said seat bottom supporting portion having a pair of outer sidewalls projecting upwardly from the outer edges of said seat bottom supporting portion and extending forwardly from the lower ends of the outer sidewalls of said seat back supporting portion, and an upwardly projecting outer sidewalls; a central divider including an upright portion, having inclined side surfaces that extend rearwardly and outwardly to said back portion, projecting forwardly from said back supporting portion, and a horizontally raised portion, formed with inclined side surfaces that extend downwardly and outwardly, on said bottom supporting portion extending forwardly from the lower end of said portion, said divider cooperating with said outer sidewalls to define a pair of seat wells; each of said seat wells including a back wall portion extending between said upright divider portion and the associated outer sidewall of said back supporting portion, and a bottom wall portion extending between said horizontal raised portion and the associated outer side wall of said bottom supporting portion; a top ledge portion extending rearwardly from the upper edge of said back supporting portion; and a pair of one-piece molder plastic interior side panels, each of said side panels having an upright attachment flange secured to one outer sidewall of said seat back supporting portion and a forwardly extending attachment flange secured to the adjacent outer sidewall of said seat supporting portion.

2. An automobile rear seat assembly as claimed in claim 1, wherein each side panel is curved outwardly and forwardly from said upright attachment flange, and is formed with an outwardly extending offset portion defining an armrest ledge, and an inwardly extending projection having a top surface extending downwardly and inwardly to the upper edge of said forwardly extending attachment flange.

3. An automobile read seat assembly as claimed in claim 2 including a rearwardly and outwardly projecting top ledge on each side panel forming extensions of the top ledge portion of said seat back supporting portion.

4. An automobile rear seat assembly as claimed in claim 3 including a recess formed in each of said inwardly extending projections, each recess having a seatbelt-receiving opening formed therein.

5. An automobile rear seat assembly as claimed in claim 4 including a sail panel projecting upwardly from the top ledge of each side panel adapted to extend between the rear and side window opening of an automobile.

6. An automobile rear seat assembly as claimed in claim 5 wherein said seat support and side panels are of rigid urethane foam.

7. An automobile rear seat assembly as claimed in claim 6 further including a seat received in each of said seat wells, each seat having a back portion seated against the backwall portion of its associated well, and a bottom portion seated against the bottom wall portion of its associated well.

8. An automobile rear seat assembly as claimed in claim 7 wherein each of said seats is of elastomeric urethane foam.

* * * * *

PO-1050
(5/69)

UNITED STATES PATENT OFFICE
CERTIFICATE OF CORRECTION

Patent No. 3,632,157                    Dated January 4, 1972

Inventor(s) THOMAS E. LOHR

It is certified that error appears in the above-identified patent and that said Letters Patent are hereby corrected as shown below:

IN THE ABSTRACT

Line 3, "walls" should be -- wells --.

IN THE SPECIFICATION

Column 2, line 16, "recessed" should be -- recesses --.

Column 2, line 40, "seal-supporting" should be -- seat-supporting --.

Column 2, line 51, after "armrest" insert -- ledge --.

Column 3, line 6, "by" should be -- to --.

Column 3, line 29, "molder" should be -- molded --.

Column 3, line 34, delete "likelyhood".

Column 3, line 39, "chang-" should be -- charg-".

IN THE CLAIMS

Column 4, claim 1, line 7, after "projecting" insert -- front wall extending between said upwardly projecting --.

Column 4, claim 1, line 15, after first "said" insert -- upright --.

PO-1050
(5/69)

UNITED STATES PATENT OFFICE
CERTIFICATE OF CORRECTION

Patent No. 3,632,157          Dated  January 4, 1972

Inventor(s) THOMAS E. LOHR

It is certified that error appears in the above-identified patent and that said Letters Patent are hereby corrected as shown below:

-2-

Column 4, claim 1, line 24, "molder" should be -- molded --.

Column 4, claim 3, line 37, "read" should be -- rear --.

Signed and sealed this 6th day of June 1972.

(SEAL)
Attest:

EDWARD M. FLETCHER, JR.
Attesting Officer

ROBERT GOTTSCHALK
Commissioner of Patents